UNITED STATES PATENT OFFICE.

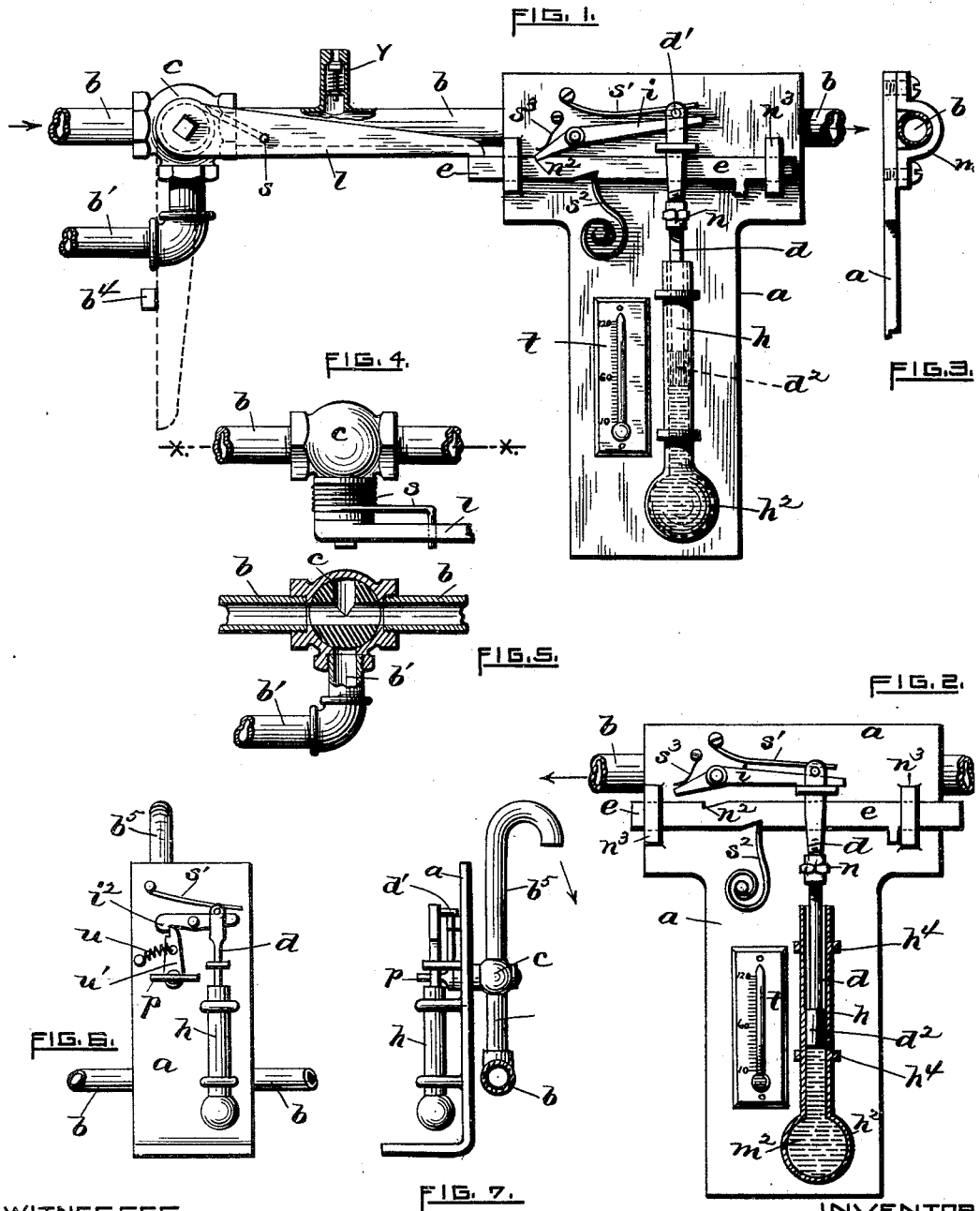

CORNELIUS MILLER, OF PROVIDENCE, RHODE ISLAND, ASSIGNOR OF ONE-FOURTH TO GEORGE W. PETTIS, OF SAME PLACE.

ANTI-FREEZING DEVICE FOR WATER-PIPES.

SPECIFICATION forming part of Letters Patent No. 410,693, dated September 10, 1889.

Application filed December 3, 1888. Serial No. 292,496. (No model.)

*To all whom it may concern:*

Be it known that I, CORNELIUS MILLER, a citizen of the United States, residing at Providence, in the county of Providence and State of Rhode Island, have invented certain new and useful Improvements in Non-Freezing Attachments for Water-Pipes, Pumps, &c.; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

In the usual manner of piping dwellings and other buildings for the introduction and circulation of water, especially in cities, where the water is under considerable pressure, the arrangement of the piping, valves, and connections is such as to require the presence of a person whenever the water is to be shut off at the main stop-cock or meter. In northern latitudes, or where the temperature falls much below the freezing-point, it is obviously very essential in the class of buildings referred to that the water is not permitted to freeze in the circulating-pipes. In the event of its thus freezing the supply of water is not only cut off but the attending risk is very great, the expansion of the ice frequently splitting the pipe, thereby involving considerable outlay of money in repairing the damaged parts. To prevent the pipes from freezing, it is the usual practice to shut off the water—say at the meter or inlet—and also to open one or more of the faucets, so as to destroy the vacuum within the pipe and allow the water to run out freely. Such construction necessarily calls for the exercise of considerable care as well as good judgment in determining when to thus shut off the water. I believe that it is not at all unusual to open the several faucets slightly and allow a small stream of water to flow out to waste in order to prevent or overcome the risk of the water freezing in the pipes.

The objects I have in view are to overcome the disadvantages before referred to and at the same time provide a device which is automatic in its action, or, rather, controlled by thermal changes. To that end I provide a three-way cock or other suitable valve and connect the same with the inlet-pipe at a point somewhat remote from the service-stop—as, for example, in a cellar near the meter or in proximity to the main or street pipe. The valve is provided with a spring-actuated or weighted lever held in check by a sliding lever or bolt, which in turn is held in position by a spring-pawl in contact with and controlled by a piston mounted in a tube and bearing against a column of mercury, alcohol, or other fluid having considerable range or change in volume when subjected to variations in temperature.

My device is susceptible of being so adjusted that it becomes operative at any temperature within its limits to which it may be set.

By the addition of a small vent or vacuum valve air is automatically introduced into the circulating-pipes, thereby, when the main valve or cock is turned to shut off the water-supply, causing the water to run out freely therefrom.

My invention is susceptible of being readily applied to pumps, especially such as are employed for domestic use; and it also may be used to automatically actuate a valve to turn on a small stream of water, so as to insure a circulation of water in the system of piping. This is advisable in some cases, particularly where the cost of the water thus wasted is nominal, all as will be more fully hereinafter set forth and claimed.

In the accompanying sheet of drawings, illustrating my improvements, Figure 1 is a front view showing the apparatus in its normal position and as combined with a portion of the supply-pipe forming a part of a circulating system. Fig. 2 is a similar view in partial section showing the sliding bolt tripped by the falling piston due to the lowered temperature and the consequent reduced volume of the mercury or liquid contained in the glass tube. Fig. 3 is a partial side view of the base or back plate to which the apparatus is attached and showing a manner of securing it to the water-pipe. Fig. 4 is a plan view of the valve or three-way cock. Fig. 5 is a central sectional view taken on line $xx$ of Fig. 4, the valve being open. Fig. 6 is a front view, reduced, showing my improvement arranged to turn on a small stream of water when the temperature falls below a fixed point; and Fig. 7 is a side view thereof.

A more complete description of my invention and the manner of its operation are as follows:

$b$ indicates the pipe which conducts water from a main or other suitable source of supply, as common. For dwellings the pipe would be located below the surface of the ground and enter, say, a cellar, a portion of the pipe being exposed to the outer air, if necessary, contiguous to a meter, if one be used. A valve $c$ is interposed in the pipe $b$, in the drawings a three-way cock being represented. To the stem of the valve is secured a lever $l$, the free end of which, when the valve is open, as in the normal position shown in Fig. 1, rests upon a bar $e$, mounted to move endwise in bearings $n^3$ of the frame or base $a$. A coiled spring $s$, attached both to the valve-casing and said lever, acts when the bar is withdrawn to close the valve and shut off the flow of water from the circulating-pipes, the lever striking a stop $b^4$. When the valve is thus closed, the water in the shut-off portion of the piping will run out by gravity to waste through the outlet-pipe $b'$, the vacuum-valve $v$ in the meantime automatically opening.

$a$ indicates a base-plate attached by means of the clamp or "clips" $m$ to the pipe $b$. To the said base-plate is pivoted a lever $i$, one end of which (when in the normal position) engages a notch $n^2$, formed in the bar $e$. The other end of said lever is adapted to support a vertically-guided rod or connection $d$, a small spring $s^3$ serving to insure the engagement of the lever with the notch.

To the upper end of the rod $d$ is secured a pin $d'$, which bears upon the free end of the lever $i$. A spring $s'$ is introduced in order to effect a contact of the pin $d'$ and the said lever, and also to overcome the friction of the piston, and thus insure its contact with the mercury at all times.

To the lower end of the connection $d$ is secured a piston $d^2$, which is fitted to move up and down in a tube $h$ of glass or other suitable material. The tube is closed at its lower end, and is preferably provided with a bulb $h^2$. This tube is secured to the base $a$ by suitable clamps or wires $h^4$. The tube is provided with a sufficient quantity of mercury $m^2$, alcohol, or other suitable liquid. Upon the column of mercury the piston $d^2$ rests, the latter being fitted in the tube so as to form a perfectly air-tight joint. If necessary oil may be used on top of the piston to form a seal. The rod $d$ is preferably made in two parts and screw-threaded, and connected by right and left nuts, thereby providing means $n$ for changing or adjusting the length of the rod.

Now, it will be seen that the action of the several parts in the event of the temperature falling, say, to 30° Fahrenheit would be substantially as follows: The mercury in the tube $h$ is contracted in volume during the lowering of temperature, as is well known. Therefore when the predetermined point (30°) is reached the mercury will have fallen in the tube sufficiently to permit the connection $d$ to withdraw the lever $i$ from the notch of the bar $e$. The latter by means of the spring $s^2$ is instantly forced rearwardly to its limit, (see Fig. 2,) thereby releasing the valve-lever $l$, when now the spring $s$ acts to close the valve and shut off the supply of water from the circulating-pipes. At the same time the valve opens into the waste-pipe $b'$ and allows the water to escape, thereby emptying the circulating-pipes. The main supply of water being thus automatically shut off by the change in temperature, I would state that the function of the spring $s'$ is to insure a downward movement of the connection $d$ and its piston corresponding with that of the mercury. The position of the lever $l$ when the valve is thus closed to shut off the water supply is indicated by dotted lines in Fig. 1.

The bar $e$ may be tripped earlier or later by a corresponding adjustment of the connection $d$, and also by the amount of contact-surface of the lever $i$ with the notch $n^2$.

In lieu of the piston $d^2$ a mounted diaphragm may be used, the same being connected to the rod $d$ and actuated by mercury, as described.

An ordinary thermometer $t$ may be attached to the base $a$, for obvious purposes.

By a slight change in the arrangement of the parts the apparatus can be employed to automatically open a small valve or petcock to allow a small stream of water to flow from the circulating-pipes, and thus prevent the water from freezing in the pipes, as shown by Figs. 6 and 7. In this case the pivoted lever $i^2$ is hooked to a lever $u'$, attached to a handle $p$ of the cock $c$. Now, as the mercury drops to the point at which the release is to take place, the rear end of the lever $i^2$ is lifted, thereby releasing the lever $u'$, the spring $u$ immediately acting to open the valve or cock, thus allowing the water to pass from the main pipe $b$ into a small pipe $b^5$ open to the air.

I contemplate the application of my device to pump-barrels or other pipes or cylinders containing water or other liquid liable to become frozen and endanger such holder or vessel. I consider the invention particularly applicable to pumps used for domestic or culinary purposes, as in case of sudden changes in temperature during the night toward zero the action of the device will at the proper point to which it has been adjusted automatically open a valve and allow the water within the pump to escape.

It is obvious that minor changes may be made in the construction and arrangement of the parts without departing from the spirit of the invention.

I claim as my invention—

1. The combination, with a mounted valve or cock, of mechanism connected with said valve and released by a piston of said mechanism actuated by the change in volume of mercury, alcohol, or other suitable liquid directly affected by thermal changes, substantially as hereinbefore described, and for the purpose specified.

2. A self-closing valve having releasing mechanism consisting of a mounted spring-actuated bar adapted to retain the valve-lever in a normal position, a connection or link provided with a piston $d^2$, supported by a column of mercury or other suitable fluid having the property of expanding and contracting by thermal changes, and a spring-pawl or lever $i$, engaging both the said spring-actuated bar and link, substantially as described.

3. The combination, with a spring-actuated bar, a tripping-lever engaging said bar directly actuated by variations due to thermal changes in the height of a column of mercury, of a stop-valve provided with a lever engaging said bar and adapted to close the valve upon the withdrawal of the bar, substantially as hereinbefore described.

4. The non-freezing attachment for water-pipes, &c., substantially as hereinbefore described, the same consisting of a water-pipe $b$, a self-closing valve or cock $c$, located in said pipe, a mounted spring-actuated bar $e$, provided with a notch $n^2$, a spring-pawl $i$, engaging said notch, a mercury-holding tube $h$, an adjustable link or rod $d$, adapted to engage the pawl $i$ and provided with a piston $d^2$, fitting said tube and in contact with the mercury, and a spring $s'$, for insuring the contact of the piston with the mercury.

In testimony whereof I have affixed my signature in presence of two witnesses.

CORNELIUS MILLER.

Witnesses:
CHARLES HANNIGAN,
GEO. H. REMINGTON.